United States Patent [19]

Seko et al.

[11] 4,209,367
[45] * Jun. 24, 1980

[54] ELECTROLYSIS OF AQUEOUS ALKALI METAL HALIDE SOLUTION

[75] Inventors: Maomi Seko; Yasumichi Yamakoshi, both of Tokyo; Hirotsugu Miyauchi, Kawasaki; Kyoji Kimoto, Yokohama; Toshioki Hane, Kawasaki; Mitsunobu Fukumoto, Yokohama; Itaru Watanabe, Yokohama; Sakae Tsushima, Yokohama, all of Japan

[73] Assignee: Asahi Kasei Kogyo Kabushiki Kaisha, Osaka, Japan

[*] Notice: The portion of the term of this patent subsequent to Oct. 31, 1995, has been disclaimed.

[21] Appl. No.: 782,713

[22] Filed: Mar. 30, 1977

[30] Foreign Application Priority Data

Apr. 5, 1976 [JP] Japan .................. 51-37919

[51] Int. Cl.² .................. C25B 13/05; C25B 1/46
[52] U.S. Cl. .................. 204/98; 204/252; 204/298
[58] Field of Search .................. 204/296, 98, 252

[56] References Cited

U.S. PATENT DOCUMENTS

| | | | |
|---|---|---|---|
| 3,356,607 | 12/1967 | Eisenmann et al. | 204/301 |
| 3,562,139 | 2/1971 | Leitz | 204/296 |
| 3,657,104 | 4/1972 | Hodgdon | 204/301 |
| 3,960,697 | 1/1976 | Kircher et al. | 204/252 |
| 4,123,336 | 10/1978 | Seko et al. | 204/98 |

*Primary Examiner*—F. C. Edmundson
*Attorney, Agent, or Firm*—Birch, Stewart, Kolasch and Birch

[57] ABSTRACT

An electrolytic cell having anode and cathode chambers separated by a cation exchange membrane comprising a fluorocarbon polymer containing pendant carboxylic acid or salt groups of the formula

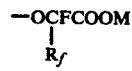

wherein R is a group containing perfluoroalkyl or perfluoroalkoxy having 1 to 5 carbon atoms and M is hydrogen, an alkali or alkaline earth metal or ammonium as a surface stratum on the cathode side of the membrane. The fluorocarbon polymer may also contain sulfonic acid groups of the formula

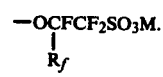

27 Claims, No Drawings

ELECTROLYSIS OF AQUEOUS ALKALI METAL HALIDE SOLUTION

BACKGROUND OF INVENTION

This invention relates to improved cation exchange membranes, to methods for their production, and a process for electrolysis of sodium chloride by using the same. More particularly, this invention relates to an improved electrolysis process by use of a cation exchange membrane comprising a perfluorocarbon polymer containing specific carboxylic acid groups of the formula

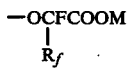

(wherein M is a hydrogen, metal or ammonium group and $R_f$ is a group containing perfluoroalkyl having 1 to 5 carbon atoms).

It has been known to the art to obtain a cation exchange membrane of a perfluorocarbon polymer containing pendant sulfonic acid groups by saponification of a membrane prepared from a copolymer of tetrafluoroethylene and perfluoro-3,6-dioxa-4-methyl-7-octene-sulfonyl fluoride. This known perfluoroacarbon type cation exchange membrane containing only sulfonic acid groups, however, has the disadvantage that the membrane, when used in the electrolysis of an aqueous solution of an alkali metal halide, tends to permit penetration therethrough of hydroxyl ions back migrating from the cathode compartment because of the high hydrophilicity of the sulfonic acid group. As a result, the current efficiency during electrolysis is low. This is a special problem when the electrolysis is used for the production of an aqueous solution of caustic soda at concentrations of more than 20 percent. In this reaction, the current efficiency is so low that the process is economically disadvantageous compared with electrolysis of aqueous solutions of sodium chloride by the conventional mercury process or diaphragm process.

The disadvantage of such low current efficiency can be alleviated by lowering the exchange capacity of the sulfonic acid group to less than 0.7 milliequivalent per gram of the H form dry resin. Such lowering, however, results in a serious decrease in the electroconductivity of the membrane and a proportional increase in the power consumption. This solution, therefore, is not without its economic difficulties.

U.S. Pat. No. 3,909,378 discloses composite cation exchange membranes containing sulfonic acid moieties as the ion exchange group and comprising two polymers with different equivalent weights (EW), that is the number of grams of polymer containing one equivalent of ion exchange functional group. When such membranes are utilized in the electrolysis of aqueous solutions of sodium chloride, high current efficiencies are obtained by effecting the electrolysis with the higher EW polymer side of the composite membrane facing the cathode. For high current efficiency coupled with low power consumption, the value of EW of the higher EW polymer must be increased and the thickness decreased as much as possible. It is, however, extremely difficult to produce a composite cation exchange membrane having a current efficiency of not less than 90 percent by use of membranes containing only sulfonic acid groups.

In U.S. Pat. No. 3,784,399, German Patent OLS No. 2,437,395 (U.S. patent application Ser. No. 406,361 filed Oct. 15, 1973) and German Patent OLS No. 2,447,540 (U.S. patent application Ser. No. 425,079 filed Dec. 17, 1973), there are suggested cation exchange membranes wherein the cathode side surface layers of fluorocarbon cation exchange membranes contain sulfonamide groups, salts thereof or N-mono-substituted sulfonamide groups. These membranes, however, are deficient in electrochemical and chemical stabilities.

U.S. patent application Ser. No. 701,515 (Canadian Patent Application No. 256,437) discloses a cation exchange membrane containing carboxylic acid groups of the formula —OCF$_2$COOM in the fluorocarbon cation exchange membrane having sulfonic acid groups. This cation exchange membrane is excellent in electrochemical properties and chemical stability, as compared with conventional cation exchange membranes. Furthermore, when used as a diaphragm for electrolysis of an aqueous sodium chloride solution, it exhibits high current efficiency with a small amount of electric consumption. From the practical standpoint, however, this membrane is not yet satisfactory in current efficiency which is desired to be high with stability during prolonged electrolysis, electric resistance of the membrane, etc.

The object of the present invention is to provide an improved electrolysis process using a cation exchange membrane high in current efficiency which is free from the drawbacks of the membrane of the prior art as mentioned above.

THE INVENTION

It has now been found that the above object can be accomplished when specific carboxylic acid groups of the formula:

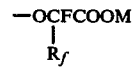

wherein M is a hydrogen atom, metallic atom or ammonium group and $R_f$ is a group containing perfluoroalkyl having 1 to 5 carbon atoms, are present as pendant groups or a part of the pendant groups in a fluorocarbon polymer which constitutes the cation exchange membrane.

The membrane of the present invention, when provided for use in electrolysis, is found to have advantages of higher current efficiency which is stable for prolonged running of the electrolysis, lower electric resistance of the membrane due to the presence of the perfluoroalkyl group adjacent to the carboxylic acid group and low electric consumption due to lower electrolysis voltage.

In the above formula, the ammonium group represented by M is preferably a quaternary ammonium having a molecular weight of 500 or less; the metallic atom is preferably selected from alkali or alkaline earth metals. As the containing perfluoroalkyl group represented by $R_f$, there may be mentioned perfluoroalkyl groups having 1 to 5 carbon atoms, among which the perfluoromethyl group —CF$_3$ is most preferred. Alternatively, $R_f$ may have perfluoroalkyl groups having 1 to 5 carbon atoms indirectly bonded to the backbone of the polymer. For example it may be such a group as —OCF$_3$, —OC$_2$F$_5$ or —CF$_2$OCF$_3$. Among them —OCF$_3$ is most preferred.

In its simplest form, a cation exchange membrane of this invention is a film forming perfluorocarbon polymer. The thickness of the film can be varied widely depending on its purpose. There is no particular limit to the thickness, but usually a thickness from 0.5 to 20 mils is suitable for many purposes.

The preferred embodiments of membranes are characterized by the presence of surface stratum at least about 100 Å in thickness in which the polymer is substituted with pendant carboxylic acid groups represented by the formula as set forth above.

The membrane of this invention can be classified into two major groups. One is a uni-layer film wherein the equivalent weight (EW) of the cation exchange groups is uniform throughout the membrane. The other is a two-ply film in which a first film having a higher EW value and a second film having a lower EW value are combined. The specific fluorocarbon polymer is present as a stratum on the surface of the membrane. The first film having a higher EW value is provided with the specific fluorocarbon polymer, preferably as surface stratum of at least 100 Å in thickness on the surface opposite to the side laminated with the second film. For practical purposes, the membrane is usually reinforced with reinforcing materials selected from the group consisting of woven fabrics of inert fibers and porous films of inert polymers, preferably polytetrafluoroethylene fibers. The reinforcing material is desirably embedded in the membrane at the side opposite to the side having the stratum of the specific fluorocarbon polymer of the invention. The reinforcing material is desirably embedded in the second film having the lower EW value.

When the membrane is used in electrolysis, the side having the stratum is placed in the electrolytic cell to face the cathode side in order to obtain the remarkable effect of the invention.

The surface stratum may also contain sulfonic acid groups which may be represented by the formula:

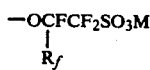
—OCFCF$_2$SO$_3$M
|
R$_f$ wherein R$_f$ and M have the same meaning as above.

In fact, since the cationic membranes of this invention are derived from sulfonic acid group substituted fluorocarbon copolymers, they may contain any predetermined proportion of sulfonic acid groups, or derivatives thereof.

The specific fluorocarbon polymer constituting the stratum of this invention may contain from 5 to 100 mol percent of carboxylic acid substituents based on total cation exchange groups. Usually, as the distance from the surface increases, the relative percent of carboxylic acid substituents decreases, and the relative percent of sulfonic acid substituents increases. In preferred embodiments of the invention, only one surface is predominantly carboxylic acid substituents, and the quantity of sulfonic acid groups will increase with distance from that surface until the opposite surface is predominantly sulfonic acid groups. According to one preferred embodiment, there is a cation exchange membrane comprising (a) a fluorocarbon polymer containing pendant carboxylic acid groups of the formula

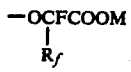
—OCFCOOM
|
R$_f$ and (b) a fluorocarton polymer having cation exchange groups substantially consisting of sulfonic acid groups of the formula

—OCFCF$_2$SO$_3$M.
|
R$_f$

According to the most preferable reinforced layer membrane, the surface stratum exists only on the side opposite to the reinforced side, the remaining portion substantially consisting of a fluorocarbon polymer having as cation exchange groups sulfonic acid groups of the formula

—OCFCF$_2$SO$_3$M.
|
R$_f$

The surface density of carboxylic acid groups may vary from 5 to 100 mol percent. The preferred range is from 20 to 100 mol percent, and the best combinations of economy and efficiency are normally realized if the density is from 40 to 100 mol percent; all based on the total number of all functional groups in the surface strata.

The dpth of the surface strata can be ascertained by straining techniques. For example, a section of a prepared membrane can be immersed for several minutes in an aqueous solution of Crystal Violet containing 5 to 10% ethanol as a solubility aid. This dye will stain only the treated sections, and a cross section of the membrane can be examined microscopically.

Alternatively, the thickness of the layer and the density of the carboxylic acid functions can be determined by X-ray microprobe analysis.

The membranes of this invention may take any of several forms, as is particularly illustrated in the examples. It may be a simple unilayer film with one or both major surfaces embodying strata with carboxylic acid substituents. Alternatively, the membranes may be composite membranes formed from two appropriately prepared and substituted perfluorocarbon films bonded together in each of which the EW is from about 1000 to 2000, preferably 1000 to 1500.

If a two film membrane is employed, the first film should have an EW which is at least 150 higher than the second film, and its thickness should be up to one half of the total thickness. In fact, the thin film should be as thin as possible to minimize total electrical resistance. Due to the difficult manufacturing techniques involved, and thin film will generally occupy from about 10 to 45% of the total thickness.

In other forms of the invention, the membranes may be laminated to reinforcing materials to improve mechanical strength. For this purpose fabrics made of polytetrafluoroethylene fibers are most suitable, although other materials which are inert to the chemical environment in which the membranes are employed may also be used. Particularly, polytetrafluoroethylene films may preferably be employed as reinforcing materials. If reinforcing materials are utilized, it is particularly advantageous to embed them in the polymer membrane.

This can be readily accomplished, for example, at elevated temperature and under reduced pressure as illustrated in the examples.

In all of these various constructions, the most preferred membranes will be constructed with carboxylic groups predominating on one surface, and sulfonic groups predominating on the other. In composite membranes the film with the higher EW will preferably carry the carboxyl groups.

The starting fluorocarbon polymer having the sulfonic acid groups as the side chain thereof is produced by copolymerizing a fluorinated ethylene and a vinyl fluorocarbon monomer having a sulfonyl fluoride group of the generic formula (I) given below:

$$FSO_2CF_2CFO(CFYCF_2O)_nCF=CF_2 \quad \text{(I)}$$
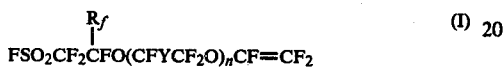

(wherein, $R_f$ is the same as defined above, Y represents F or a fluoroalkyl group having 1 to 5 carbon atoms and n an integer having the value of 0–3), if necessary, in conjunction with a monomer selected from the class consisting of hexafluoropropylene, $CF_3CF=CF_2$ and compounds of the generic formula (II) given below:

$$F(CF_2)_l O(CFCF_2O)_p CF=CF_2 \quad \text{(II)}$$
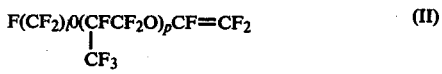

(wherein l represents an integer having the value of 1–3 and p an integer having the value of 0–2), thereby deriving a polymer possessing a side chain of

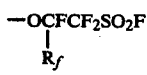
$$-OCFCF_2SO_2F$$
$$\phantom{-O}R_f$$

shaping the resultant polymer in the form of a membrane and thereafter converting the side chain

$$-OCFCF_2SO_2F$$
$$\phantom{-O}R_f$$

of said polymer into the group

$$-OCFCF_2SO_3M$$
$$\phantom{-O}R_f$$

through saponification.

Typical examples of fluorinated ethylene include vinylidene fluoride, tetrafuoroethylene and chlorotrifluoroethylene. Among them, tetrafluoroethylene is most preferred.

Typical examples of the vinyl fluorocarbon monomer hving the sulfonyl fluoride group of the aforementioned generic formula include those enumerated below:

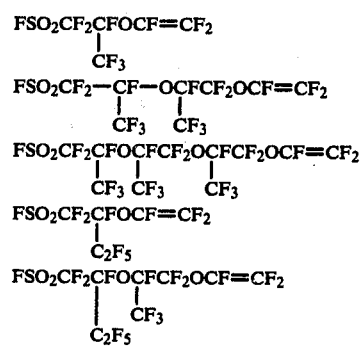

Of the vinyl fluorocarbon monomers having the sulfonyl fluoride group available at all, the most desirable is perfluoro(3,6-dioxa-2,4-dimethyl-7-octene sulfonyl fluoride),

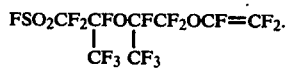

A typical example of the fluorovinyl ether of the generic formula (II) which takes part, where necessary, in said copolymerization is perfluoromethyl vinyl ether.

The process of the invention is applicable to all of the sulfonyl substituted polymers described in U.S. Pat. No. 3,909,378.

Advantageously, the membrane is first formed with the sulfonyl substituted polymer which is then converted by reactions described more fully hereinafter to a membrane of the invention.

The preferred copolymer composition for starting materials is such that the fluorinated ethylene monomer content is from 30 to 90 percent by weight, preferably from 40 to 75 percent by weight, and the content of the perfluorovinyl monomer possessing the sulfonyl fluoride group is from 70 to 10 percent by weight, preferably from 60 to 25 percent by weight. The materials are produced by procedures well known in the art for the homopolymerization or copolymerization of a fluorinated ethylene.

Polymerization may be effected in either aqueous or nonaqueous systems. Generally, the polymerization is performed at temperatures of from 0° to 200° C. under pressure of from 1 to 200 kg/cm². Frequently, the polymerization in the nonaqueous system is carried out in a fluorinated solvent. Examples of such nonaqueous solvents include 1,1,2-trichloro-1,2,2-trifluoroethane and perfluorocarbons such as perfluoromethylcyclobutane, perfluorooctane and perfluorobenzene.

The aqueous system polymerization is accomplished by bringing the monomers into contact with an aqueous solvent containing a free radical initiator and a dispersant to produce a slurry of polymer particles, or by other well known procedures.

After the polymerization, the resultant polymer is shaped to form a membrane using any of a variety of well known techniques.

The copolymer is desired to have an EW in the range of from 1000 to 2000. The membrane having a low EW is desirable in the sense that the electric resistance is proportionally low. A membrane of a copolymer having a notably low EW is not desirable since the mechanical strength is not sufficient. A copolymer having a notably high EW cannot easily be shaped in the form of a membrane. Thus, the most desirable range of EW is from 1000 to 1500.

The copolymer, after being shaped into a membrane, can be laminated with a reinforcing material such as fabrics for improvement of mechanical strength. As the reinforcing material, fabrics made of polytetrafluoroethylene fibers are most suitable. The aforesaid stratum should preferably be allowed to be present on the surface opposite to the side on which the reinforcing material is lined.

In case of the cation exchange membrane having two bonded films which is the preferred embodiment of the invention as mentioned above, two kinds of copolymers having different EW are prepared according to the polymerization methods as described above, followed by shaping, and fabricated into a composite film. The first film is required to have an EW of at least 150 greater than the EW of the second film and also to have a thickness of not more than one half of the entire thickness. The thickness of the first film is preferably as thin as possible, since electric resistance is greatly increased with an increase in EW. Thus, the thickness of the first film which depends on the EW thereof is required to be 50% or less of the entire thickness, preferably from 45 to 10%.

It is important that the first film of a higher EW is present in the form of a continuous film formed parallel to the surface of the membrane.

The overall thickness of said composite cation exchange membrane, though variable with the kind of particular ion exchange group used, the strength required of the copolymer as the ion exchange membrane, the type of electrolytic cell and the conditions of operation, generally has a lower limit of 4 mils and no upper limit. The upper limit is usually fixed in consideration of economy and other practical purposes.

Said composite membrane may be laminated with fabrics or some other suitable reinforcing material with a view to improvement of the mechanical strength thereof. The reinforcing material is preferably embedded in the second film. As the reinforcing material, fabrics made of polytetrafluoroethylene filaments are most suitable.

For the preparation of the products of this invention, the pendant sulfonyl groups in the form represented by the formulas:

$$-\text{OCFCF}_2\text{SO}_2\text{X} \quad (A)$$
$$\quad | \quad$$
$$\quad R_f$$

and/or

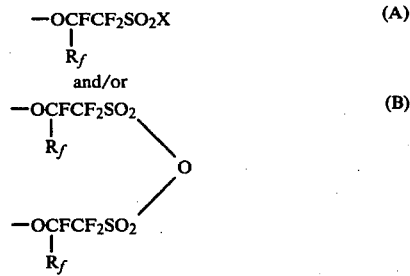
(B)

wherein X is halogen, especially fluorine or chlorine; hydroxyl; alkyl containing up to four carbon atoms; aryl or OZ where Z is a metallic atom, especially an atom of an alkali metal, alkyl containing up to four carbon atoms or aryl; are converted to:

$$-\text{OCFCOOM}$$
$$\quad |$$
$$\quad R_f$$

by treatment with a reducing agent.

Since the conversion to a carboxylic acid group is effected chemically, it can be controlled so as to produce products with substantially any degree of carboxylation which may be desired.

The starting polymers are usually formed from sulfonyl fluoride substituted compounds which remain intact during polymerization. The sulfonyl fluoride groups can directly be treated with a reducing agent to be converted to the carboxylic acid groups. Alternatively, they may be first converted to any of the other derivatives of sulfonic acid as defined in the above formulas (A) and (B) by known reactions, followed by conversion into the carboxylic acid groups. The sulfonyl chloride groups are especially preferred due to higher reactivity. Therefore, it is more desirable to convert the sulfonyl fluoride to any of the other derivatives of sulfonic acid defined above in connection with the definition of X. Such reactions can be readily carried out by procedures well known to the art.

The formation of the carboxylic group may follow any of several pathways.

It may be formed by reduction to a sulfinic acid with a relatively weak reducing agent followed by a heat treatment as indicated below:

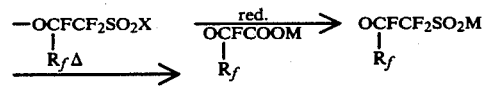

Conversion into carboxylic acid groups can more readily be effected when M in the above formulas is hydrogen. Alternatively the treatment may be stepwise in which initially a sulfinic acid is produced, and this is converted to a carboxylic group by the use of a strong reducing agent. This may take place as indicated below:

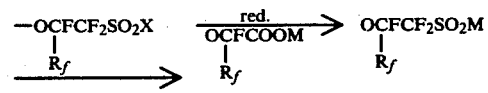

With some reducing agents, the treatment may be directly from the sulfonic group to the carboxylic group, as indicated by,

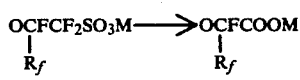

It is preferred that the concentration of sulfinic acid groups in the final product be relatively low. Accordingly, it may be desirable, but not necessary, to oxidize sulfinic acid groups to sulfonic acid groups by the following sequence:

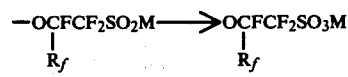

This may be accomplished by known procedures utilizing aqueous mixtures of sodium hydroxide and hypochlorite.

The reducing agents which can be used in the present invention are exemplified as shown below. Those skilled in the art are completely familiar with these reducing agents and many other similar reducing agents as well as procedures by which they are employed. However, some of the reducing agents such as hydrazine having amino groups which are capable of forming sulfonamide groups as disclosed in German Patent OLS No. 2,437,395 (U.S. patent application Ser. No. 406,361 filed Oct. 15, 1973) are not suitable for the purpose of the invention, and therefore they are excluded from the scope of the invention.

The reducing agents of the first group are metal hydrides of the generic formula $MeLH_4$, wherein Me represents an alkali metal atom and L an aluminum or boron atom, or $Me'H_x$, wherein Me' represents an alkali metal atom or alkaline earth metal atom and x is an integer with a value of 1 to 2. These include, for example, lithium aluminum hydride, lithium boron hydride, potassium boron hydride, sodium boron hydride, sodium hydride and calcium hydride.

The reducing agents of the second group are inorganic acids possessing reducing activity such as, for example, hydroiodic acid, hydrobromic acid, hypophosphorous acid, hydrogen sulfide and arsenious acid.

The reducing agents of the third group are mixtures of metals and acids. Examples of these mixtures include tin, iron, zinc and zinc amalgam and those of acids include hydrochloric acid, sulfuric acid and acetic acid.

The reducing agents of the fourth group are compounds of low-valency metals. Examples of these compounds include stannous chloride, ferrous sulfate and titanium trichloride. They may be used in conjunction with such acids as hydrochloric acid and sulfuric acid.

The reducing agents of the fifth group are organic metal compounds. Examples of these reducing agents include butyl lithium, Grignard reagent, triethyl aluminium and triisobutyl aluminum.

The reducing agents of the sixth group are inorganic acid salts possessing reducing activity and similar compounds. Examples of these reducing agents include potassium iodide, sodium iodide, potassium sulfide, sodium sulfide, ammonium sulfide, sodium sulfite, sodium dithionite, sodium phosphite, sodium arsenite, sodium polysulfide and phosphorus trisulfide.

The reducing agents of the seventh group are mixtures of metals with water, steam, alcohols or alkalis. Examples of metals usable in the mixtures include sodium, lithium, aluminum, magnesium, zinc, iron and amalgams thereof. Examples of alkalis include alkali hydroxides and alcoholic alkalis.

The reducing agents of the eighth group are organic compounds possessing a reducing activity such as, for example, triethanol amine and acetaldehyde.

Among the groups as enumerated above, those belonging to the second, third, fourth and sixth groups are found to be preferable.

The optimum conditions for treatment with a reducing agent will be selected depending on the selected reducing agent to be used and on the kind of the substituent X in the $SO_2X$ group. Generally, the reaction temperature is in the range of from $-50°$ C. to $250°$ C., preferably from $0°$ C. to $150°$ C., and the reducing agent is used in the form of a gas, liquid or solution. As the solvent for the reaction, there can be used water; polar organic solvents such as methanol, tetrahydrofuran, diglyme, acetonitrile, propionitrile or benzonitrile; or nonpolar organic solvents such as n-hexane, benzene or cyclohexane or mixtures of such solvents.

The amount of the reducing agent is not less than the equivalent weight of the sulfonyl group present in the surface. Generally, the reducing agent will be used in large excess. The pH value of the reaction system will be selected on the basis of the particular reducing agent employed.

The reaction can be carried out under reduced, normal or increased pressure. In the reaction involving the use of a gaseous reducing agent, the increased pressure can improve the velocity of the reaction.

The reaction time generally ranges from one minute to 100 hours.

In case of a cation exchange membrane reinforced with a reinforcing material, treatment with a reducing agent is preferably applied onto the side opposite to the reinforced side.

The course of the reaction may be followed by analysis of the infrared absorption spectrum of the membrane, as is particularly illustrated in the examples. Key bands in following the reaction are as follows:

sulfonyl chloride: 1420 cm$^{-1}$
sulfinic acid salt: 940 cm$^{-1}$
sulfinic acid salt 1010 cm$^{-1}$
carboxylic acid: 1780 cm$^{-1}$
carboxylic acid salt: 1690 cm$^{-1}$ The specific function groups of the invention are found to be unitary species having a neutralization point at approximately $pKa=2.5$ from measurement of electric resistance and infrared spectrum by varying pH. Said functional groups exhibit characteristic absorption at 1780 cm$^{-1}$ (H form) and at 1690 cm$^{-1}$ (Na form). Furthermore, when converted into chlorides by treatment with $PCl_5/POCl_3$, they are found to exhibit characteristic absorption at 1810 cm$^{-1}$. From these measurements, they are identified to be carboxylic acid groups. By elemental analysis by the combustion method, the sulfur atom is found to be decreased by one atom per one exchange group. The fluorine atom is observed to be removed by two atoms per one exchange group by the alizarin-complexion method. From these results of analysis and also from the fact that carboxylic acids are formed by use of a reducing agent containing no carbon atom under an atmosphere in the absence of a carbon atom, the above functional groups are confirmed to be

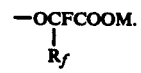

This structure is also evidenced by measurement of the NMR spectrum of $C^{13}$ of the product obtained by the reaction, corresponding to the above polymer reaction, conducted for the monomer having the functional group of

The products of the treatment with a reducing agent may take three typical forms. These are:

(1) All of the —COOM groups required may be formed.

(2) Not all —COOM groups required may be formed and —SO₂M groups may be present.

(3) Substantially all —SO₂M groups may be present.

In the first instance, no further treatment will be required. In the second and third case, there are two alternatives. A more powerful reducing agent may be employed, or the —SO₂M groups may be converted to carboxylic acid groups by heat treatment, which is advantageously carried out when M is hydrogen. The heating may take place at any selected practical pressure at a temperature of from 60° C. to 400° C. for a period of from 15 to 120 minutes. The preferred conditions for efficiency and economy are atmospheric pressure, 100° C. to 200° C., and 30 to 60 minutes.

Any remaining sulfinic acid groups may be converted into the sulfonic acid groups, if desired. This conversion of the sulfinic acid group to the sulfonic acid group can easily be accomplished such as by subjecting the former group to oxidation in an aqueous solution of 1 to 5 percent NaClO or an aqueous solution of 1 to 30 percent $H_2O_2$ at 40° C. to 90° C. for 2 to 20 hours.

The reducing agent to be used for the purpose of this invention is selected, as in ordinary organic reactions, with due consideration to numerous factors such as the kind of the substituent X in the SO₂X group, the kind of the reducing agent, the kind of the solvent to be used, the temperature of the reaction, the concentration, the pH value, the reaction time and the reaction pressure.

The reducing agents usable for this invention are broadly divided by their reactions as follows.

The reducing agents of the first group can be applied to virtually all SO₂X groups. Occasionally the reaction proceeds to an advanced extent to produce a a product which appears to be an alcohol.

The reducing agents of the second, third and fourth groups are particularly effective when applied to sulfonyl halide groups of relatively high reactivity.

The reducing agents of the fifth, sixth, seventh and eighth groups are also effective for application to sulfonyl halide groups, although use of these reducing agents frequently produces the sulfinic acid alone. Use of the —SO₂F group demands specially careful selection of the reaction conditions, for it may possibly induce hydrolysis in the presence of a reducing agent from the sixth, seventh and eighth groups.

It is possible to convert the —SO₂Cl group directly into the carboxylic acid group without going through the intermediate of sulfinic acid. For example, the conversion can be accomplished by subjecting the membrane of the fluorocarbon polymer possessing the —SO₂Cl group to elevated temperature and/or to ultraviolet rays and/or to an organic or inorganic peroxide.

As a matter of course, the reaction of the present invention can be applied to other monomers possessing similar side chains. Thus, fluorocarbon monomers possessing a sulfinic acid group or carboxylic acid group can readily be synthesized by said reaction.

It will be noted that the ultimate effect of the treatment with a reducing agent can be represented by the following reaction:

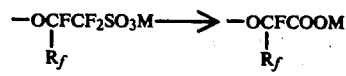

EXAMPLE 1

Tetrafluoroethylene and perfluoro(3,6-dioxa-2,4-dimethyl-7-octane sulfonylfluoride) were copolymerized in 1,1,2-trichloro-1,2,2-trifluoroethane using perfluoropropionyl peroxide as the polymerization initiator at 45° C., under the pressure of 6 atmospheres at the time of polymerization. The exchange capacity of the resultant polymer, when measured after saponification, was 0.87 milliequivalent/gram of dry resin.

This copolymer was molded with heating into a film of 0.3 mm in thickness. It was then saponified in a mixture of 2.5 N caustic soda/50 percent methanol at 60° C. for 16 hours, converted to the H form in 1 N hydrochloric acid at 90° C. for 16 hours, and heated at 120° C. under reflux for 20 hours in a 1:1 mixture of phosphorus pentachloride and phosphorus oxychloride to be converted into the sulfonylchloride form. At the end of the reaction, the copolymer membrane was washed under reflux with carbon tetrachloride and then subjected to measurement of attenuated total reflection spectrum (hereinafter referred to as A.T.R.) which showed a strong absorption band at 1420 cm$^{-1}$ characteristic of sulfonylchloride. In a Crystal Violet solution, the membrane was not stained. Between frames made of acrylic resin, two sheets of this membrane were fastened in position by means of packings made of polytetrafluoroethylene. The frames were immersed in an aqueous 57 percent hydroiodic solution so that only one surface of each membrane would undergo reaction at 80° C. for 24 hours. Then, the treated surface of the membrane was subjected to measurement of A.T.R. In the spectrum, the absorption band at 1420 cm$^{-1}$ characteristic of the sulfonylchloride group vanished and an absorption band at 1780 cm$^{-1}$ characteristic of the carboxylic acid group appeared instead. In the Crystal Violet solution, a layer of about 10 microns on one surface of the membrane was stained.

This membrane was saponified in a mixture of 2.5 N caustic soda/50% aqueous methanolic solution at 60° C. for 16 hours, followed further by oxidation treatment in a mixture of 2.5 N caustic soda/2.5% aqueous sodium hypochlorite solution at 90° C. for 16 hours to obtain a homogeneous and tough fluorocarbon cation exchange membrane. The specific conductivity of this membrane was measured in 0.1 N aqueous caustic soda solution to be $10.0 \times 10^{-3}$ mho/cm.

The specific conductivity of the membrane was determined by initial conversion to a complete Na form, keeping the membrane in a constantly renewed bath of an aqueous 0.1 N caustic soda solution at normal temperature for ten hours until equilibrium and subjecting it to an alternating current of 1000 cycles while under an aqueous 0.1 N caustic soda solution at 25° C. for measurement of the electric resistance of the membrane.

The aforementioned Na form cation exchange membrane for use in electrolysis was equilibrated in an aqueous 2.5 N caustic soda solution at 90° C. for 16 hours, incorporated in an electrolytic cell in such way that the treated surface fell on the cathode side. The current efficiency was found to be 97%. The electrolytic cell consisted of anode and cathode chambers separated by the cation exchange membrane having a current passage area of 15 cm² (5 cm×3 cm). A dimensionally stable metal electrode was used for the anode and an iron plate for the cathode. While a 3 N aqueous sodium chloride solution maintained at pH 3 was circulated through the anode chamber and 35% aqueous caustic soda solution through cathode chamber at 90° C., current was passed at the current density of 50 ampere/dm². The current efficiency was calculated by dividing the amount of caustic soda formed in the cathode chamber by the theoretical amount determined from the amount of current passed.

COMPARISON EXAMPLE 1

The membrane in the form of sulfonylchloride as obtained in Example 1 was saponified in 2.5 N caustic soda/50% methanol solution to the form of sulfonic acid. The specific conductivity and current efficiency of the thus obtained ion exchange membrane were measured under the same conditions as in Example 1 to $10.7 \times 10^{-3}$ mho/cm and 56%, respectively.

EXAMPLE 2

The same procedure as described in Example 1 was repeated except that the membrane used was prepared from a copolymer obtained by ternary copolymerization of perfluoropropylvinyl ether together with the monomers as used in Example 1. As the result, a high current efficiency similar to Example 1 was obtained.

EXAMPLE 3

The sulfonylchloride form membrane as obtained in Example 1 was reduced in 35% aqueous hypophosphite solution at 80° C. for 10 hours and then subjected to measurement of A.T.R. The absorption at 1420 cm$^{-1}$ of sulfonylchloride groups was found to be vanished but the absorption at 1780 cm$^{-1}$ of carboxylic acid groups was not so strong. After being washed with water, this membrane was treated in 47% hydroiodic solution at 80° C. for 20 hours, whereby the absorption at 1780 cm$^{-1}$ of carboxylic acid groups became stronger.

When this membrane was saponified in 2.5 N caustic soda/50% aqueous methanol solution and again subjected to measurement of A.T.R., the absorption at 1780 cm$^{-1}$ of carboxylic acid groups shifted to 1690 cm$^{-1}$ of carboxylic acid salt and small absorptions of sulfinic acid salts also appeared at 940 and 1010 cm$^{-1}$. The specific conductivity and the current efficiency of this membrane were measured under the same conditions as in Example 1 to be $10.1 \times 10^{-3}$ mho/cm and 96%, respectively.

EXAMPLE 4

The polymerization of Example 1 was repeated except that the pressure at the time of polymerization was changed to 6.5 ata.

The exchange capacity of this copolymer was measured to be 0.79 milligram equivalents/gram of dry resin.

A sulfonylfluoride form membrane with a thickness of 0.2 mm was prepared from this copolymer and the membrane was saponified on one surface with 2.5 N caustic soda/50% aqueous methanol solution.

This membrane was superposed with the non-saponified surface downward on a plain-weave fabric with a thickness of 0.15 mm made of polytetrafluoroethylene woven with 40 yarns per inch in both warp and weft of 400 denier multifilaments. The fabric was thus embedded for reinforcement in the membrane by heating at 270° C., while pressing the membrane against the fabric under evacuation.

This membrane was converted to the form of sulfonylchloride. Two sheets of this membrane were positioned with the sides in which the fabric was embedded face to face between frames of acrylic resins and immersed in 15% aqueous sodium sulfide solution to carry out the reaction at 60° C. for one hour while under injection of nitrogen gas. The measurement of the treated surface of the membrane by A.T.R. gave the result that absorption at 1420 cm$^{-1}$ of sulfonyl chloride completely vanished and strong absorptions of sulfinic acid salts appeared at 940 cm$^{-1}$ and 1010 cm$^{-1}$ instead. After this membrane was immersed in 1 N hydrochloric acid at 60° C. for 10 hours to be converted to the H form, the membrane was heated at 150° C. for 120 minutes, followed again by conversion to the Na form in 2.5 N caustic soda. By measurement of the thus obtained membrane by A.T.R., absorptions at 940 cm$^{-1}$ and 1010 cm$^{-1}$ of sulfinic acid salts remained slightly and a strong absorption of carboxylic acid salt appeared at 1690 cm$^{-1}$. The sulfonylchloride groups remaining in the internal portion of the membrane were saponified with 2.5 N caustic soda/50% aqueous methanol solution. The specific conductivity and the current efficiency with the treated surface facing the cathode, determined under the same conditions as in Example 1, were $2.2 \times 10^{-3}$ mho/cm and 97%, respectively.

COMPARISON EXAMPLE 2

The reinforced membrane as prepared in Example 4 was saponified and then subjected to measurement of the specific conductivity and current efficiency under the same conditions as in Example 1, whereby the specific conduivity was found to be $2.7 \times 10^{-3}$ mho/cm and current efficiency 63%.

EXAMPLE 5

In this Example, the polymer obtained in Example 1 is referred to as "Polymer 1". The copolymerization of Example 1 was repeated except that the pressure at the time of polymerization was changed to 7 ata. The resultant polymer was saponified and the exchange capacity of the saponified product was measured to be 0.73 milligram equivalent/gram of dry resin. This polymer is referred to as "Polymer 2".

The Polymer 1 and Polymer 2 were shaped by heating into films of 0.1 mm and 0.05 mm, respectively. A composite film was prepared by combining these membranes under heating.

With the side of Polymer 1 in this composite film downward, the film was superposed on a plain-weave fabric with a thickness of 0.1 mm made of polytetrafluoroethylene woven with 40 fibers/inch of 400 denier multifilaments in both warp and weft. The fabric was embedded in the membrane for reinforcement by heating at 270° C. while pressing the membrane against the fabric under evacuation.

Two sheets of this membrane, being placed face to face on the sides wherein fabrics are embedded between stainless steel frames, were immersed in a solution of lithium aluminum hydride in tetrahydrofuran to carry out the reaction at 60° C. for 20 hours. After the reaction, the treated surface on the side of Polymer 2 was subjected to measurement of A.T.R., whereby the characteristic absorption of sulfonylfuoride at 1740 cm$^{-1}$ was found to be completely vanished and the absorption of carboxylic acid salt appeared at 1690 cm$^{-1}$. After treatment of this membrane under the same conditions as in Example 1, the specific conductivity and the current efficiency with the treated surface facing the cathode were measured under the same conditions as in Example 1 to be $3.3 \times 10^{-3}$ mho/cm and 98%, respectively.

COMPARISON EXAMPLE 3

The membrane after reinforcement as obtained in Example 5 was saponified and subjected to measurement of the specific conductivity and the current efficiency with the treated surface facing the cathode under the same conditions as in Example 1. The specific conductivity was $3.8 \times 10^{-1}$ mho/cm and current efficiency 67%.

What we claim is:

1. A process for the electrolysis of an aqueous alkali metal halide solution which comprises passing an electric current through said solution in an electrolytic cell divided into an anode chamber and a cathode chamber while supplying said aqueous solution to the anode chamber, the anode and cathode chambers being divided by a cation exchange membrane which is a fluorocarbon polymer film comprising (a) a fluorocarbon polymer containing pendant carboxylic acid groups of the formula:

and (b) a fluorocarbon polymer having cation exchange groups substantially consisting of sulfonic acid groups of the formula:

said fluorocarbon polymer (a) existing as surface stratum of at least 100 Å in thickness on the cathode side of the membrane, wherein $R_F$ is a perfluoroalkyl or perfluoroalkoxy group containing from one to five carbon atoms and M is selected from the group consisting of hydrogen, alkali metals, alkaline earth metals and quaternary ammonium groups having a molecular weight up to 500.

2. A process as in claim 1, wherein the fluorocarbon polymer (a) further contains pendant sulfonic acid groups of the formula

3. A process as in claim 2, wherein the content of carboxylic acid groups in the fluorocarbon polymer is not less than 5 mole % and that of sulfonic acid groups not more than 95 mole % based on the total cation exchange groups.

4. A process as in claim 3 wherein the distribution of acid groups in the fluorocarbon polymer (a) is such that the relative mole percent of carboxylic acid groups decreases from a first surface to the surface in contact with the fluorocarbon polymer (b) and the relative mole percent of sulfonic acid groups decreases from said surface in contact with the fluorocarbon polymer (b) to said first surface.

5. A process as in claim 1 in which the membrane comprises two bonded films, a first film containing the

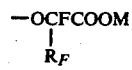

groups, and a second film containing the

groups; the equivalent weight of the polymer in each film being from 1000 to 2000, the equivalent weight of the polymer in the first film being higher by at least 150, the thickness of the first film being up to 50% of the total thickness.

6. An electrolytic cell containing an anode chamber and a cathode chamber separated by a cation exchange membrane which is a fluorocarbon polymer film comprising (a) a fluorocarbon polymer containing pendant carboxylic acid groups of the formula:

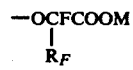

and (b) a fluorocarbon polymer having cation exchange groups substantially consisting of sulfonic acid groups of the formula:

said fluorocarbon polymer (a) existing as surface stratum of at least 100 Å in thickness on the cathode side of the membrane, wherein $R_F$ is a perfluoroalkyl or perfluoroalkoxy group containing from one to five carbon atoms and M is selected from the group consisting of hydrogen, alkali metals, alkaline earth metals and quaternary ammonium groups having a molecular weight up to 500.

7. The electrolytic cell of claim 6, wherein the fluorocarbon polymer (a) further contains pendant sulfonic acid groups of the formula

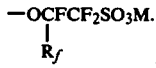

8. The electrolytic cell of claim 7, wherein the content of carboxylic acid groups is not less than 5 mole % and that of sulfonic acid groups not more than 95 mole % based on the total cation exchange groups.

9. The electrolytic cell of claim 8 wherein the distribution of acid groups in the fluorocarbon polymer (a) is such that the relative mole percent of carboxylic acid groups decreases from a first surface to the surface in contact with the fluorocarbon polymer (b) and the relative mole percent of sulfonic acid groups decreases from said surface in contact with the fluorocarbon polymer (b) to said first surface.

10. The electrolytic cell of claim 6 wherein the membrane comprises two bonded films, a first film containing the

groups, and a second film containing the

groups; the equivalent weight of the polymer in each film being from 1000 to 2000, the equivalent weight of the polymer in the first film being higher by at least 150, the thickness of the first film being up to 50% of the total thickness.

11. A cation exchange membrane for use in the electrolysis of alkali metal halides to produce an alkali metal hydroxide in the cathode portion of an electrolytic cell and a halogen in the anode portion of an electrolytic cell, which is a fluorocarbon polymer film comprising (a) a fluorocarbon polymer containing pendant carboxylic acid groups of the formula

and (b) a fluorocarbon polymer having cation exchange groups substantially consisting of sulfonic acid groups of the formula

said fluorocarbon polymer (a) existing as surface stratum of at least 100 Å in thickness on the cathode side of the membrane, wherein $R_F$ is a perfluoroalkyl or perfluoroalkoxy group containing from one to five carbon atoms and M is selected from the group consisting of hydrogen, alkali metals, alkaline earth metals and quaternary ammonium groups having a molecular weight up to 500.

12. The membrane of claim 11, wherein the fluorocarbon polymer (a) further contains pendant sulfonic acid groups of the formula

13. The membrane of claim 12, wherein the content of carboxylic acid groups in the fluorocarbon polymer is not less than 5 mole % and that of sulfonic acid groups not more than 95 mole % based on the total cation exchange groups.

14. The membrane of claim 13 wherein the distribution of acid groups in the fluorocarbon polymer (a) is such that the relative mole percent of carboxylic acid groups decreases from a first surface to the surface in contact with the fluorocarbon polymer (b) and the relative mole percent of sulfonic acid groups decreases from said surface in contact with the fluorocarbon polymer (b) to said first surface.

15. The membrane of claim 12 wherein $R_F$ is a perfluoromethyl group.

16. The membrane of claim 12 reinforced with a woven fabric of inert fibers.

17. The membrane of claim 16 wherein the inert fibers are polytetrafluoroethylene.

18. The membrane of claim 11 wherein $R_F$ is a perfluoromethyl group.

19. The membrane of claim 11 which is comprises two bonded films, a first film containing the

groups, and a second film containing the

groups; the equivalent weight of the polymer in each film being from 1000 to 2000, the equivalent weight of the polymer in the first film being higher by at least 150, the thickness of the first film being up to 50% of the total thickness.

20. The membrane of claim 19 wherein the first film additionally contains

groups.

21. The membrane of claim 20, wherein the first film comprises (a) a fluorocarbon polymer containing pendant carboxylic acid groups of the formula

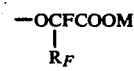

and (b) a fluorocarbon polymer having cation exchange groups substantially consisting of sulfonic acid groups of the formula

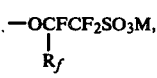

said fluorocarbon polymer (a) existing as surface stratum of at least 100 Å in thickness on the first film.

22. The membrane of claim 21 wherein the fluorocarbon polymer (a) further contains pendant sulfonic acid groups of the formula

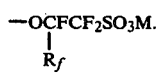

23. The membrane of claim 19 reinforced with a woven fabric of inert fibers.

24. The membrane of claim 23 wherein the inert fibers are polytetrafluoroethylene.

25. The membrane of claim 23 wherein the woven fabric is in the second film.

26. The membrane of claim 11 reinforced with a woven fabric of inert fibers.

27. The membrane of claim 26 wherein the inert fibers are polytetrafluoroethylene.

* * * * *